Patented Sept. 5, 1944

2,357,676

UNITED STATES PATENT OFFICE 2,357,676

PLASTICIZERS AND TACKIFIERS FOR RUBBER, WAXES, AND THE LIKE

Gerry P. Mack, Jackson Heights, N. Y., assignor to Advance Solvents & Chemical Corporation, New York, N. Y., a corporation of New York No Drawing. Application October 4, 1941, Serial No. 413,653

6 Claims. (Cl. 260—761)

This invention relates to the plasticization and tackification of rubber, and, more particularly, to the use of synthetic hydrocarbon oil polymers of high viscosity and high viscosity index as plasticizers for natural rubber.

The plasticized rubber products according to my invention are useful as adhesive compositions for many purposes, as, for instance, in adhesive tapes, in cements for the shoe industry, hot melt compositions for laminating of paper sheets and many others. In many cases it is desirable to have the adhesive composition in the form of water dispersions or emulsions such as adhesives based on latex. The synthetic hydrocarbon oils which serve as plasticizers according to the present invention have been found by me to be particularly useful for latex dispersions.

Some of the plasticized rubber mixtures according to my invention may be vulcanized to produce a very soft, low modulus material suitable for the manufacture of sealing products, gloves or balloons.

Tackifying rubber by use of mineral oils or isoolefine polymers with or without resins has been suggested although the rubber industry recognizes that such oils and polymers must be used only in small amounts as otherwise they will "sweat out" to the surface of the finished article, and when the composition is used for adhesives this "sweating out" may destroy the adhesiveness of the rubber or latex composition. Further, such oils or polymers when used in adhesive masses on a rubber basis as are employed for the making of surgical adhesive tapes have a tendency to migrate into the fabric backing and thus to change the characteristics of the adhesive with the aging of the tape.

One object of my invention is, therefore, the production of rubber and rubber-latex compositions containing hydrocarbon oils which will act as plasticizers and tackifiers for natural rubber and rubber latex without having any tendency to "sweat" or "bloom" out of the rubber mass even though the synthetic hydrocarbon oil is used in a ratio of up to 50% of the rubber.

According to the invention, the subject is accomplished by incorporating into the rubber and rubber latex compositions a plasticizer and tackifier comprising a complex hydrocarbon polymer oil of the type described in U. S. Patent 2,224,349.

Although the actual method of preparing the synthetic hydrocarbon oils to be used according to the present invention per se is not part of this invention, a brief description of their preparation will be given for the sake of illustration.

In general the manufacture of these synthetic hydrocarbon oils comprises catalytically polymerizing gaseous or low boiling point olefines under such conditions as will result in the production of olefinic polymers of high viscosity and high viscosity index. Thus the gases produced in the thermal conversion or cracking of petroleum gas oils or residuum are fractionated to remove the greater part of the pentane component and components of higher boiling point and of propane and components of lower boiling point. Such a fraction may be composed of the following hydrocarbon ingredients, in which typical proportions are represented, which proportions, however, vary considerably according to the type of oil cracked and according to the character of the cracking operation:

| | Liquid volume percent |
|---|---|
| Propylene | 1.0 |
| Propane | 4.0 |
| Isobutene | 15.0 |
| Butenes 1 and 2 | 28.0 |
| Butanes | 50.0 |
| Pentanes | 2.0 |

This butane-butene fraction is led through a washing or scrubbing tower and treated with dilute aqueous alkaline hydroxide solution. The fraction then passes through a drier packed with calcium chloride to give a dried fraction with an acceptable low concentration of mercaptan and sulfide sulfur.

The olefine-containing hydrocarbon liquid is mixed with a hydrocarbon such as a butane containing a certain percentage of normal unpolymerized butenes to assist in the control of the polymerizing action and this mixture is passed through a polymerizing chamber. According to a typical example set forth in the table on page 5 of U. S. Patent 2,224,349, the stream of liquid hydrocarbons introduced into the polymerizing chamber contains, for instance, about 127.5 volume parts of isobutene to about 490 volume parts of normal butenes and about 2423 volume parts of butane (calculated from column 14 of the table). The hydrocarbon liquid as passed through the top of the polymerizing chamber is at about 0° F. The temperature rises as the polymerization reactions take place and the temperature of the mixed stream leaving the bottom of the reaction chamber is about 80-100° F. The polymerizing catalyst used is anhydrous aluminum chloride. In the polymerizing chamber, substantially all the isobutene present in the mixture is polymerized, but the butane remains unchanged and about 63% (309.5 volume parts as calculated from column 24 of the table) of the normal butenes are not polymerized so that the highly viscous polymer fraction dissolved in the hydrocarbon liquid stream leaving the polymerizing chamber is formed by a copolymerization of about 127.5 liquid volume parts of isobutene with about 180.5 liquid volume parts of normal butenes.

The mixture of hydrocarbon liquid and spent catalyst is passed through to a settling vessel and then is passed through an absorbent earth such as a Florida clay. This gives a crystal clear, water-white liquid containing greater amounts of inert hydrocarbons accompanying the original olefine-containing material employed, together with the "butane" but containing in solution the high viscosity polymers produced in the polymerizing chamber.

The polymer-containing liquid is introduced into a flash chamber, the liquid contents of which are held at a temperature sufficient to vaporize the butane, pentane and like low boiling hydrocarbons and cause their removal in vapor form. The viscous polymers remaining in the flash chamber from the hydrocarbon oils which are used as rubber plasticizers according to the present invention. As brought out in the U. S. Patent 2,224,349 above referred to, the synthetic hydrocarbon oils of high viscosity index obtained in the manner described have the property of being viscous liquids rather than plastic solids. They consist chemically of both normal olefine and iso olefine polymer and for all ordinary purposes can be considered as pure hydrocarbons being highly resistant to oxidation and other changes. Their viscosity index is above 60, their viscosity at 210° F. is within the range 40 to 10,000 seconds Saybolt Universal, and their viscosity gravity constant is below 0.78 (see claim 11 of U. S. Patent 2,224,349).

The following illustrates some properties of the synthetic hydrocarbon oils utilized according to this invention:

Table

|  | 1 | 2 | 3 |
| --- | --- | --- | --- |
| Molecular weight | 350 | 1,300 | 3,000 |
| Viscosity, Saybolt Universal at 210° F | 50 | 3,000 | 6,200 |
| Neutralization number | .01 | .01 | .01 |
| Saponification number | Nil | Nil | Nil |
| Specific gravity at 60° F | .85 | .90 | .91 |

The synthetic hydrocarbon oils suitable for my use are those having a viscosity of from 50 to 10,000 seconds as measured by a Universal Saybolt viscosimeter at 210° F.

The more detailed practice of the invention is illustrated by the following examples, wherein parts are given by weight, unless otherwise stated. These examples, however, are illustrative of the invention and not a limitation thereon.

Example 1

| | Parts |
| --- | --- |
| Polymer fraction (viscosity S. S. U. at 210° F.=3100) | 58 |
| Oleic acid | 2 |
| Triethanolamine | 1 |
| Water | 39 |

An emulsion excellently stable in the cold is produced from these components by rapidly agitating the polymer fraction, adding the oleic acid and triethanolamine and then gradually adding the water until a smooth stable emulsion is formed.

The above emulsion readily blends with latex in any proportion and will give the dried latex films a pronounced tack which is highly desirable in adhesives used for dry combining or in the adhesives used in shoe construction.

The advantage of the above emulsion in latex adhesives is that up to 50 or even 75% of the polymer fraction can be used on latex rubber without any danger of the polymer "sweating" or "blooming" out to the surface as would happen if mineral or paraffin oils were used in the same ratio.

Example 2

| | Parts |
| --- | --- |
| Latex (60% centrifuged) | 166 |
| Polymer emulsion (as in Ex. 1) | 50 |
| Zinc oxide | 5 |
| Sulfur | 2 |
| Accelerator | 1 |
| Dispersing agent | 1 |
| Water | 20 |

The vulcanizing ingredients are dispersed in the usual ball mill and then added to the latex-polymer emulsion mixture. The films are then formed by casting the emulsion on glass, allowing to dry and then vulcanizing in hot air (220° F.) for 15 minutes. The resulting cured film was relatively non-tacky and had a very soft or low modulus. Such low modulus stocks are particularly useful in latex compounds for sealing products, gloves and balloons. No "sweating" or "blooming" is observed, even after prolonged storage.

The above procedure was duplicated but a heavy paraffin oil was substituted for the polymer emulsion. After curing and storing for 24 hours a film of oil had "bloomed" to the surface giving an oily, sticky and undesirable surface.

For most latex adhesives the use of from 5 to 30% of the polymer fraction to the latex rubber is sufficient for the ordinary type of latex adhesive but where a greater and more pronounced tack is desired it is preferred to use the polymer fraction in combination with a resin. Both natural and synthetic resins are suitable for this purpose although the preferred type of resin is a low acid number ester-gum, natural gums, polymerized terpene resins, hydrogenated coumarone-indene resins or a natural resin such as dammar resin.

Example 3

| | Parts |
| --- | --- |
| Polymer fraction (viscosity S. S. U. at 210° F.=3100) | 100 |
| Ester gum (acid No. 6–8) | 100 |
| Oleic acid | 8 |
| Ammonia (26° Bé.) | 30 |
| Water | 140 |

The polymer fraction and ester gum are melted in a suitable container and held at a temperature of about 185° F. While vigorously agitating this melt, the water plus the ammonia are slowly added and the stirring continued until a smooth emulsion is formed.

50 parts of the above emulsion are blended with 50 parts of a 60% concentrated rubber latex. The resulting composition is a very suitable base for use as a masking tape such as used in paint and lacquer spraying. This composition is also useful for self-sealing envelopes, bookbinding and similar uses where good adhesion of the dried latex film is desired. The above composition can be further modified by the use of fillers, pigments, vulcanizing ingredients and the like, depending on the final use for such compositions.

Rubber compositions such as exemplified above have excellent aging qualities although where better aging is desired small amounts of from .25 to 1% of the dry rubber of antioxidants such as are commercially used for this purpose can be added.

The emulsions of the polymer fractions can also be made with other emulsifiers such as sodium stearate, sulphonated derivatives, casein and similar emulsifying agents commonly employed for producing emulsions.

Although the above examples were directed to the use of such polymer fractions in latex, I do not mean to limit myself to such use as I have found that these polymers are also very suitable for plasticizing and tackifying dry rubber compounds. These polymers are particularly suitable for use in surgical tape adhesives where a lasting and permanent tack or adhesiveness is desired. The usual oils and resins now employed for this purpose have the drawback of oxidizing and vaporizing thereby to change the adhesive characteristics. This is especially true in warmer climates and high temperatures as might be found in storage of such tapes. The use of the polymer fractions as a tackifier gives a more uniform adhesiveness and this adhesiveness is retained over a prolonged period and even under artificial aging conditions such as the air bomb test used in the rubber industry.

What I claim is:

1. An aqueous natural rubber dispersion containing as a plasticizer and tackifier for each 100 parts by weight of solid rubber between 25 parts by weight and 45 parts by weight of a liquid synthetic hydrocarbon oil having a viscosity of about 3100 seconds Saybolt Universal at 210° F., a viscosity index above 60, and a viscosity gravity constant below 0.78, said hydrocarbon oil being obtained by polymerizing a mixture containing a greater quantity of normal butenes and a smaller quantity of isobutene under circumstances such that substantial amounts of both, the normal butenes and the isobutene are polymerized.

2. Tacky unvulcanized rubber compositions suitable as adhesives and free from any tendency to "bloom," said compositions containing as plasticizer and tackifier for each 100 parts by weight of solid rubber between 25 parts by weight and 45 parts by weight of a liquid synthetic hydrocarbon oil having a viscosity of about 3100 seconds Saybolt Universal at 210° F., a viscosity index above 60, and a viscosity gravity constant below 0.78, said hydrocarbon oil being obtained by polymerizing a mixture containing a greater quantity of normal butenes and a smaller quantity of isobutene under circumstances such that substantial amounts of both, the normal butenes and the isobutene are polymerized.

3. Vulcanized substantially non-tacky natural rubber compositions having a very soft or low modulus and being free from any tendency to "bloom," said compositions containing as plasticizer for each 100 parts by weight of solid rubber between 25 parts by weight and 45 parts by weight of a liquid synthetic hydrocarbon oil having a viscosity of about 3100 seconds Saybolt Universal at 210° F., a viscosity index above 60, and a viscosity gravity constant below 0.78, said hydrocarbon oil being obtained by polymerizing a mixture containing a greater quantity of normal butenes and a smaller quantity of isobutene under circumstances such that substantial amounts of both, the normal butenes and the isobutene are polymerized.

4. A rubber adhesive composition containing 50 parts by weight of a 60% concentrated rubber latex and 50 parts by weight of an emulsion comprising about 26% by weight of ester gum, about 5% by weight of oleic acid, about 8% by weight of ammonia of 26° Bé., about 35% by weight of water and about 26% by weight of a liquid synthetic hydrocarbon oil having a viscosity of 3100 seconds Saybolt Universal at 210° F., a viscosity index above 60, and a viscosity gravity constant below 0.78, said hydrocarbon oil being obtained by polymerizing a mixture containing a greater quantity of normal butenes and a smaller quantity of isobutene under circumstances such that substantial amounts of both, the normal butenes and the isobutene are polymerized.

5. A vulcanizable rubber composition containing 166 parts by weight of a 60% concentrated rubber latex, 5 parts by weight of zinc oxide, 2 parts by weight of sulfur, 1 part by weight of an accelerator, 1 part by weight of a dispersing agent, 20 parts by weight of water and 50 parts by weight of a polymer emulsion comprising 1% by weight triethanolamine, 2% by weight oleic acid, 39% by weight of water and 58% by weight of a highly viscous liquid synthetic hydrocarbon oil having a viscosity of about 3100 seconds Saybolt Universal at 210° F., a viscosity index above 60, and a viscosity gravity constant below 0.78, said hydrocarbon oil being obtained by polymerizing a mixture containing a greater quantity of normal butenes and a smaller quantity of isobutene under circumstances such that substantial amounts of both, the normal butenes and the isobutene are polymerized.

6. A natural rubber composition containing as a plasticizer for each 100 parts by weight of solid rubber between 25 parts by weight and 45 parts by weight of a highly viscous liquid synthetic hydrocarbon oil obtained by a copolymerization of about 127.5 liquid vol. parts of isobutylene with about 180.5 liquid vol. parts of normal butenes in the presence of a hydrocarbon liquid containing butane and an excess of normal butenes, said hydrocarbon oil having a viscosity index above 60, a viscosity at 210° F. of about 3,100 seconds Saybolt Universal and a viscosity gravity constant below 0.78.

GERRY P. MACK.